(12) United States Patent
Gaeta et al.

(10) Patent No.: US 11,916,372 B2
(45) Date of Patent: Feb. 27, 2024

(54) MOTOR PROTECTION DEVICE

(71) Applicant: BELIMO HOLDING AG, Hinwil (CH)

(72) Inventors: Maurizio Gaeta, Wetzikon (CH); Thomas Gay, Fläsch (CH); Stephan Haag, Berikon (CH)

(73) Assignee: BELIMO HOLDING AG, Hinwil (CH)

( * ) Notice: Subject to any disclaimer, the term of this patent is extended or adjusted under 35 U.S.C. 154(b) by 206 days.

(21) Appl. No.: 17/634,327

(22) PCT Filed: Oct. 2, 2020

(86) PCT No.: PCT/EP2020/077620
§ 371 (c)(1),
(2) Date: Feb. 10, 2022

(87) PCT Pub. No.: WO2021/069315
PCT Pub. Date: Apr. 15, 2021

(65) Prior Publication Data
US 2022/0311238 A1 Sep. 29, 2022

(30) Foreign Application Priority Data

Oct. 7, 2019 (CH) ....................... 1271/19

(51) Int. Cl.
*H02H 7/085* (2006.01)
(52) U.S. Cl.
CPC ................. *H02H 7/0852* (2013.01)
(58) Field of Classification Search
CPC ........ H02H 3/083; H02H 7/085; H02H 3/085; H02H 5/04; H02H 3/00; H02H 7/00;
(Continued)

(56) References Cited

U.S. PATENT DOCUMENTS

| 3,742,303 A | 6/1973 | Dageford |
| 3,851,216 A | 11/1974 | Clarke et al. |

(Continued)

FOREIGN PATENT DOCUMENTS

| EP | 2 544 353 A1 | 1/2013 |
| GB | 1 415 254 A | 11/1975 |

OTHER PUBLICATIONS

Swiss Search Report for 12712019 dated Jan. 28, 2020.
International Search Report for PCT/EP2020/077620 dated Dec. 17, 2020.

*Primary Examiner* — Antony M Paul
(74) *Attorney, Agent, or Firm* — Sughrue Mion, PLLC

(57) ABSTRACT

A motor protection device (1) that includes an interrupter unit (11, Q1, Q2) for electrically connecting a power supply (Vcc) and an electric motor (M) in an operation mode and electrically disconnecting the power supply (Vcc) and the electric motor in an alternative overload mode. The motor protection device further includes an overload detection unit (12) that is configured to monitor a motor current and to control the interrupter unit (11, Q1, Q2) to switch from the operation mode into the overload mode if the motor current indicates an overload condition of the electric motor (M) in the operation mode. The motor protection device (1) further includes a recovery detection unit (13) that is configured to monitor a motor temperature and to control the interrupter unit (11, Q1, Q2) to switch from the overload mode back into the operation mode if the motor temperature indicates a recovery from the overload condition.

15 Claims, 6 Drawing Sheets

(58) Field of Classification Search
CPC .... H02H 3/066; H02H 7/0833; H02H 7/0852; H02H 7/08; H02K 11/27; H02K 11/25; H02P 29/00; H02P 29/02; H02P 29/027; H02P 29/032; H02P 29/0241; H02P 29/40; H02P 29/60; H02P 29/64; H02P 29/66; H02P 29/68; H02P 9/00; H02P 9/006; H02P 6/12; H02P 6/14; H02P 6/32; H02P 21/22; H02P 23/07; H02P 25/00; H02P 25/03; H02P 27/00; H02P 27/04; H02P 27/06; H02P 27/08; H02P 1/42; H02P 1/46

See application file for complete search history.

(56) References Cited

U.S. PATENT DOCUMENTS

| | | | |
|---|---|---|---|
| 3,887,844 | A | 6/1975 | Yoshida |
| 3,978,382 | A | 8/1976 | Pfarrer et al. |
| 4,236,135 | A | 11/1980 | Holden |
| 4,266,257 | A | 5/1981 | Rudich, Jr. |
| 7,113,376 | B2 | 9/2006 | Nomura et al. |
| 7,499,253 | B2 | 3/2009 | Hirata et al. |
| 7,936,141 | B2 | 5/2011 | Lee et al. |
| 2011/0260534 | A1 | 10/2011 | Rozman et al. |
| 2017/0331271 | A1* | 11/2017 | Pedrotti ................ H02K 11/27 |

\* cited by examiner

MOTOR PROTECTION DEVICE

CROSS REFERENCE TO RELATED APPLICATIONS

This application is a National Stage of International Application No. PCT/EP2020/077620 filed Oct. 2, 2020, claiming priority based on Swiss Patent Application No. 01271/19 filed Oct. 7, 2019.

FIELD OF THE INVENTION

The present invention relates to protection devices for electric motors, electric drives with an electric motor and a protection device, as well as to methods for operating an electric motor. The invention is particularly useful in critical application where any damage of an electric drive and/or equipment that is actuated by an electric drive must be prevented with a high degree of safety.

BACKGROUND OF THE INVENTION

Electric motors and drives are used in a wide variety of applications, including safety-critical applications. Examples are critical safety valves operated by a servo drive, or safety drives e. g. in form of spring return drives that are used to move fire dampers or smoke dampers as used in fire protection systems.

A general issue of concern for electric drives is the occurrence of overload conditions that may, if not detected and handled appropriately, at least significantly reduce the lifetime of the motor or further components, and further cause defects and/or severe hazards, e. g. fires due to overheating. Therefore, appropriate detection and handling of overload conditions is at least highly desirable and in some applications also regulatory required.

SUMMARY OF THE INVENTION

For detecting overload conditions of an electric motor or drive, respectively, a number of strategies and approaches is known in the art.

In particular, it is known how to detect an overload by way of measuring a motor temperature with temperature sensors that are, e. g. located in the area of the motor coil(s). This approach, however, has the disadvantage that an overload condition may be reflected by the temperature only in delayed and slow manner. Further, it necessarily requires temperature sensors as additional components and additional wiring for the connection. At least the first-mentioned drawback is also present if the motor temperature is measured indirectly via the coil resistance.

Furthermore, it is known to detect an overload temperature via the current that is drawn by the motor by evaluating either the voltage drop over a shunt resistor. This approach, however, has the general disadvantage that the current provides a criterion for switching off the motor in case of an overload conditions, but does not provide an optimized criterion for a recovery of the motor from the overload condition, i. e. when the motor may again be safely energized. Typically, the motor is powered again after a predetermined recovery time. Such recovery time, however, may be too short under certain conditions and/or be unnecessarily long under other conditions.

It is further known to detect a blocked motor by evaluating the back-EMF (electro-motive force) that is generated by an electric motor when running. This approach, however, is only suited for detecting a blocked drive, but not for reliably detecting an overload when the motor is still running.

It is an overall objective of the present invention improve the state of the art regarding the overload protection of electric motors and favorably to avoid at least some drawbacks of the prior art fully or partly.

In an aspect, the overall objective is achieved by a motor protection device. The motor protection device includes an interrupter unit for electrically connecting a power supply and an electric motor in a operation mode and electrically disconnecting the power supply and the electric motor in an overload mode. In the operation mode, the electric motor is connected with the power supply, the motor is energized. In the overload mode the electric motor and the power supply are disconnected, the electric motor is de-energized.

The motor protection device further includes an overload detection unit. The overload detection unit is configured to monitor a motor current and to control the interrupter unit to switch from the operation mode into the overload mode if the motor current indicates an overload condition of the electric motor in the operation mode. The motor protection device further includes a recovery detection unit. The recovery detection unit is configured to monitor a motor temperature and to control the interrupter unit to switch from the overload mode back into the operation mode if the motor temperature indicates a recovery from the overload condition.

In a further aspect, the overall objective is achieved by an electric drive. The electric drive includes a motor protection device according to any embodiment as disclosed above and/or further below. The electric drive further includes an electric motor. Optionally, the electric drive may include further components such as a reduction gear and/or end switches. In some embodiments, the electric drive is a servo drive or a spring return drive.

In a further aspect, the overall objective is achieved by a method for operating an electric motor. The method includes the step of connecting the electric motor and a power supply in an operation mode. The method further includes, in the operation mode, monitoring a motor current and switching from the operation mode into an alternative overload mode if the motor current indicates an overload condition of the electric motor. The electric motor and the power supply are disconnected in the overload mode. The method includes monitoring, in the overload mode, a motor temperature of the electric motor and switching from the overload mode back into the operation mode if the motor temperature indicates a recovery from the overload condition.

In a further aspect, the overall objective is achieved by the use of a motor protection device according to any embodiment as disclosed above and/or further below for operating an electric motor.

A motor protection in accordance with the present invention combines desired characteristics and advantages of different approaches in a favorable manner, while avoiding or minimizing their disadvantages. In particular, the detection of an overload condition via the motor current has a minimal response time and allows a quick disconnection of the motor from the power supply. Further, the motor current indicates both an overload condition while the motor is still running and a condition where the motor is mechanically blocked. The temperature as measure for the recovery from an overload condition provides a reliable criterion when the motor can again be energized and connected with the power supply, taking into account the overall application situation, in particular the environmental temperature at which the motor is operated. Thereby, it can be ensured that the motor is given sufficient time for recovery and is not energized again too early, while avoiding an unnecessarily long waiting time.

The above-mentioned advantages are associated with the fact that the motor current reflects a change of the motor load virtually immediately, while the motor temperature reacts slower with a comparatively long time constant.

The switching from the overload mode into the operation mode under control of the recovery detection unit may in particular follow respectively be subsequent to a switching from the operation mode into the overload mode under control of the overload detection unit. Switching from the operation mode into the overload mode occurs if the motor current indicates an overload condition, and subsequent switching back from the overload mode into the operation mode occurs if the motor temperature indicates a recovery. Switching into the overload mode is accordingly current-based and switching back into the operation mode is temperature-based.

In some embodiments, switching from the operation mode into the overload mode is necessarily current-based and only occurs if the motor current indicates an overload condition as explained before. Additionally, or alternatively, switching from the overload mode back into the operation mode is necessarily temperature-based and only occurs if the motor temperature indicates a recovery. In further embodiments, however, switching from the operation mode into the overload mode and/or switching from the overload mode back into the operation mode may optionally also be triggered by further means. In particular, the overload detection unit may be configured to monitor the motor temperature and to control the interrupter unit to switch from the operation mode into the overload mode if the motor temperature indicates an overload condition of the electric motor in the operation mode.

The motor protection device may be realized as a specifically designed circuit, using active components such as integrated and/or discrete semiconductors components and passive components as generally known in the art. However, the motor protection device may also be realized fully or partly by one or more programmable components, such as ASICSs, microprocessors or microcontrollers with corresponding code respective programming. This particularly holds true for the overload detection unit and the recovery detection unit.

The motor protection device may include a power supply interface and a motor interface that are designed for connecting with the power supply and the electric motor, respectively. The power supply interface and the motor interface may be realized as releasable connectors such as plugs and/or sockets, but may also be designed for example as soldering interfaces or, screw interfaces, or the like. It is to be understood that the motor protection device may be realized as dedicated and self-contained assembly, and/or may be realized integral with further units or assemblies, such as the power supply and and/or a power module. It is noticed that a connection of the motor protection device with a power supply and the electric motor may be direct or indirect, that is, via further units, components, circuits or assemblies.

The electric motor may, in some designs, be an ordinary DC motor or AC motor. In some favorable and typical embodiments, however, the motor is an electronically commutated (EC) motor respectively brushless DC motor. In such embodiment, a power module may be foreseen to generate the drive signals for the one or more motor coil(s), for motor speed regulation, and the like.

The power supply is in the following assumed as DC power supply, such as a battery and/or electronic power supply unit that provides a DC supply voltage. The power supply may, in other embodiments, also be an AC power supply, in dependence of the electric motor and the overall design.

The interrupter unit may include one or more switching elements that are, in an operational configuration, electrically arranged in series with the power supply and the electric motor. The interrupter unit may include one or more electromechanically switches, such as relays. In typical embodiments that are assumed in the following, however, the interrupter unit is realized on solid-state basis and includes one or more semiconductor components, such as FETs or MOSFETs as voltage-controlled switches. In further embodiment, the interrupter unit is formed integrally with a power circuit, with one or more switching elements of the power circuit, e. g. FET(s) or MOSFET(s), acting as interrupter unit.

As will explained further below in more detail, the motor protection device may include a bi-stable circuit that controls the interrupter unit. The two alternative states correspond to the operation mode and overload mode, respectively. Switching of the bi-stable circuit and accordingly between the operation mode and the overload mode is favorably controlled by control signals that are generated by the overload detection unit and/or the recovery detection unit.

In some embodiments, the motor temperature is a temperature of one or more motor coils of the electric motor. Further in some embodiments, the recovery detection unit is configured to monitor a resistance of one or more motor coil(s). Corresponding methods for operating an electric motor may include monitoring a resistance of one or more motor coil(s). The recovery detection unit of such embodiments includes a resistance monitoring circuit. The resistance of the one or more motor coil(s) serves as indirect measure respectively indicator for the motor temperature. In the context of the present disclosure the term "resistance" is to be understood as electrical resistance.

Monitoring a motor coil resistance as indirect temperature indicator has the particular advantage that no additional sensors and further no additional wiring for such sensors are needed. Instead, the positive temperature coefficient (PTC) property of the coil material, particularly copper, is exploited. As the temperature of the motor coil(s) decreases, the resistance accordingly also decreases.

In designs where the electric motor is an electronically commutated motor, two or more, typically three single motor phases are present, each phase embodying one or more coils and each phase corresponding to one electrical contact of the motor. In embodiments where the motor coils are configured as star (Y configuration), the resistance that can be measured between each two of the phases respectively contacts is given by the resistance of the motor coils of two of the phases in series. In embodiments where the motor coils are arranged as delta (Δ configuration), the resistance that can be measured between each two of the phases respectively motor contacts is the resistance of the motor coils of one of the phases. A monitoring of the electrical resistance of one or more motor coil(s) may in particular be a monitoring of a resistance between two phases of the motor.

In alternative embodiments, the recovery detection unit is configured to monitor the motor temperature by monitoring a temperature in, at, or close to the motor, in particular the motor coil(s), via a separate temperature sensing element. In such embodiments, the recovery detection unit includes a temperature monitoring circuit, with the temperature sensing element being part of the temperature monitoring circuit.

In some embodiments, the motor protection device may be configured to electrically connect a sensing input of the recovery detection unit with the electric motor in the overload mode and to disconnect the sensing input and the electric motor (M) in the operation mode. This may in particular be the case in embodiments where monitoring the motor temperature in the overload mode is performed by monitoring the resistance of one or more motor coil(s) as explained before and the sensing input is a resistance sensing input. Here, the connection may be a connection with motor contacts. The connecting and disconnecting may be achieved via one or more switching elements, such as voltage-controlled switches. The disconnection in the operation mode is favorable since resistance monitoring would otherwise interfere with the regular motor operation.

Further in some embodiments, the motor protection device may be configured to provide power to at least part of the recovery detection unit in the overload mode but not the operation mode. In particular, resistors or voltage dividers of the recovery detection unit may not be powered in the operation mode. This type of embodiment has the advantage of reducing the overall power consumption since the recovery detection unit is only powered when needed.

In some embodiments, the motor protection device includes a shunt resistor and the overload detection unit is configured to monitor the motor current by measuring a voltage drop over the shunt resistor. In such embodiments, the overload detection unit includes a current monitoring circuit.

In some embodiments, monitoring the motor current includes comparing the motor current with a given motor current threshold. The overload detection unit may accordingly be configured to compare the motor current with the motor current threshold. Further in some embodiments, the motor current indicates an overload condition only if the motor current exceeds the motor current threshold for a given overload time threshold. The motor current threshold defines an upper current limit that shall not be exceeded in operation. The motor current indicating an overload condition—and accordingly switching from the operation mode into the overload mode—only if the threshold current is exceeded for a given overload time threshold avoids a switching into the overload mode in case of current peaks or temporary short overload episodes that are considered as uncritical.

For comparing the motor current with a given motor current threshold, the overload detection unit may include a comparator circuit. The comparator circuit favorably compares a signal that reflects the motor current, e. g. the voltage drop over a shunt resistor as explained before, with a reference, for example an overload reference voltage, reflecting the motor current threshold, and provides an output depending on the results of the comparison.

For determining if the motor current exceeds the motor current threshold for a given overload time threshold, the overload detection unit may include a timer, for example a countdown timer. The countdown timer is started with an initial time value that corresponds to the overload time threshold. The countdown timer is stopped if the motor current falls below the overload current threshold while running; in this case, the timer may then be reset to the initial value or left at its position waiting for another event where the motor current reaches a value higher than the motor current threshold. Upon reaching zero, an output of the countdown timer controls the switching from the operation mode into the overload mode and the timer is reset to the initial value. In alternative embodiments, alternative arrangements such as an upwards-counting timer or a low-pass filtering of the motor current signal may be used.

In some embodiments, monitoring the motor temperature includes comparing the motor temperature with a given motor temperature threshold. The recovery detection unit may accordingly be configured to compare the motor temperature with the motor temperature threshold. Further, in some embodiments, the motor temperature indicates a recovery from the overload condition only if the motor temperature remains below the motor temperature threshold for a given recovery time threshold.

The motor temperature threshold defines a temperature limit above which the electric motor shall not be energized again after an overload, respectively, below which the motor temperature shall be fallen before energizing the motor again. The temperature indicating a recovery—and accordingly allowing switching back from the overload mode into the operation mode—only if the motor temperature is below the motor temperature threshold for a given recovery time threshold is an additional safety measure that prevents the motor from being energized again before it has sufficiently recovered in case of short drops below the threshold motor temperature.

For comparing the motor temperature with a given motor temperature threshold, the recovery detection unit may include a comparator circuit. The comparator circuit favorably compares a signal that reflects the motor temperature, e. g. resistance between two of the motor phases, respectively, a voltage drop over the motor coil(s), with a reference, for example a recovery reference voltage, that reflects the motor temperature threshold, and provides an output in dependence of the comparison result.

For determining if the motor temperature is below the motor temperature threshold for a given recovery time threshold, the recovery detection unit may include a timer, for example a countdown timer. The countdown timer is started with an initial time value that corresponds to the recovery time threshold. The countdown timer is stopped if the temperature rises above the threshold motor temperature while running; in this case, the timer may then be reset to the initial value or left at its position waiting for another event where the motor temperature reaches a value lower than the motor temperature threshold. Upon reaching zero, an output of the countdown timer controls the switching from the overload mode into operation mode and the timer is reset to the original value. In alternative embodiments, alternative arrangements such as an upwards-counting timer or a low-pass filtering of the temperature signal may be used.

In some embodiments, at least one of the interrupter unit, the overload detection unit and the recovery detection unit is designed in an at least partly redundant manner. Exemplary designs for this type of embodiment are explained in more detail further below.

In some embodiments, the electric drive includes a power module. The power module is electrically connected with the electric motor. The interrupter unit is further electrically connected or integral with the power module. The electric motor is electrically connected with an output side of the power module. An input side of the power module may be arranged in series with the interrupter unit. In such embodiment, the input side of the power module is, in an operational configuration, electrically connected with the power supply in the operation mode, such that electric power is supplied from the power supply to the electric motor. The input side of the power module is electrically disconnected from the power supply in the overload mode, such that no electric power is supplied to the electric motor. In embodiments where the electric motor is an electronically commutated motor, the power module may include the circuitry for the commutation and accordingly be designed to provide the drive signals for each of the motor coils in a generally known manner. In some embodiments with a power module, the interrupter unit is integral with the power module. In such embodiments, switching elements of the power module, such as MOSFETs or other semiconductor-based switching elements, serve at the same time as interrupter unit. The input side of the power supply may, in typical designs that are assumed here, be suitable and/or designed for connecting with a DC power supply and have a supply voltage terminal and a ground terminal.

In some embodiments, the electric drive includes a reduction gear coupled to the motor shaft of the electric motor. Further in some embodiments, the electric drive is a spring return drive and includes a return spring operatively coupled to the motor shaft and/or a reduction gear. The electric drive may particularly be designed as safety drive. Further, the electric drive may be designed to be operatively coupled and controlled by an external control device, such as an HVAC (Heating, Ventilation and Air Conditioning) control and/or a fire protection system. It is noted, however that a motor protection device and method are not limited to a particular type of electric drive but may be used for all kinds of electric drives with an electric motor that requires overload protection.

The electric drive may be designed for operative coupling with a driven element, in particular a valve or a damper, such as a fire damper or smoke damper.

In case of the electric drive being a spring return drive, the motor is energized during regular operation to maintain a desired position of an output element of the safety drive, e.g., an output shaft of the safety drive, in a desired position. Thereby, the driven device 1s held in a desired operation position, for example a fully opened position, a fully closed position, or any desired intermediate position. In the non-energized state of the motor, e. g. in an emergency situation or in case of a motor overload, the return spring moves the output element of the safety drive and accordingly the driven device into a pre-determined safety position.

DESCRIPTION OF THE EMBODIMENTS

Figure 1:
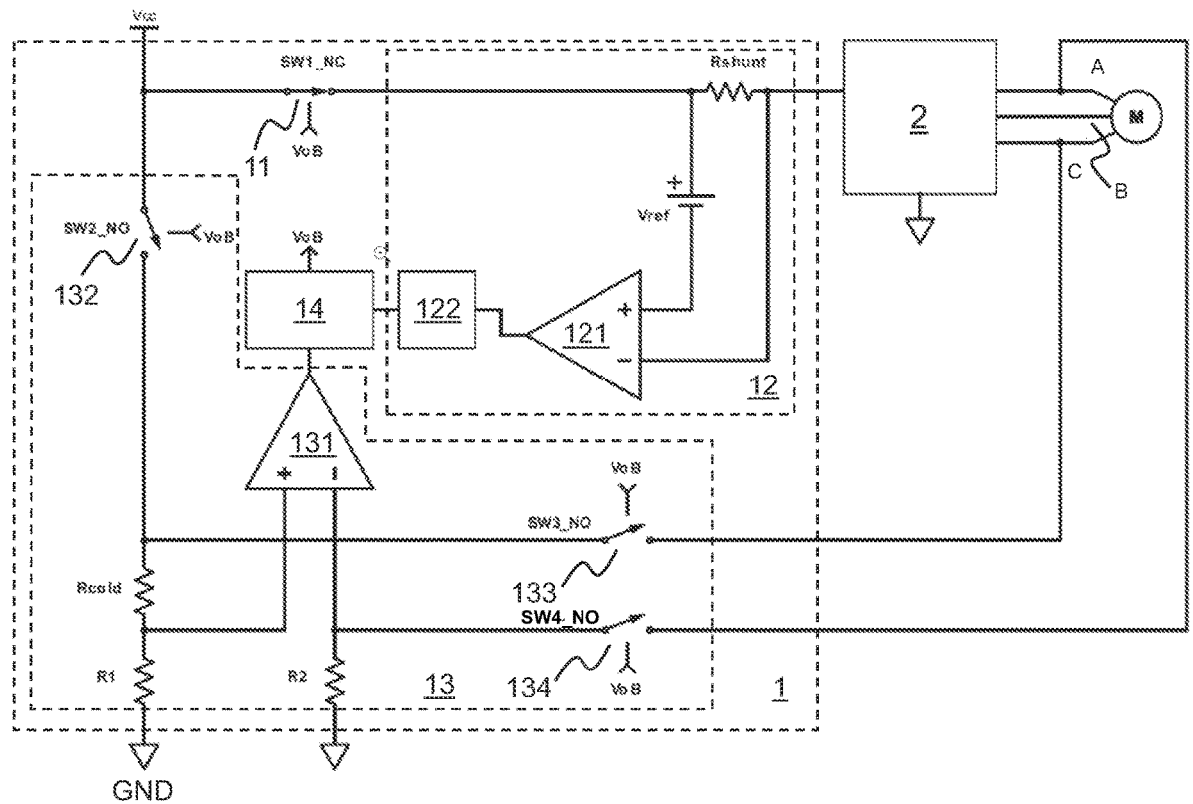
FIG. 1 shows an embodiment of a motor protection device in the operation mode.
Figure 2:
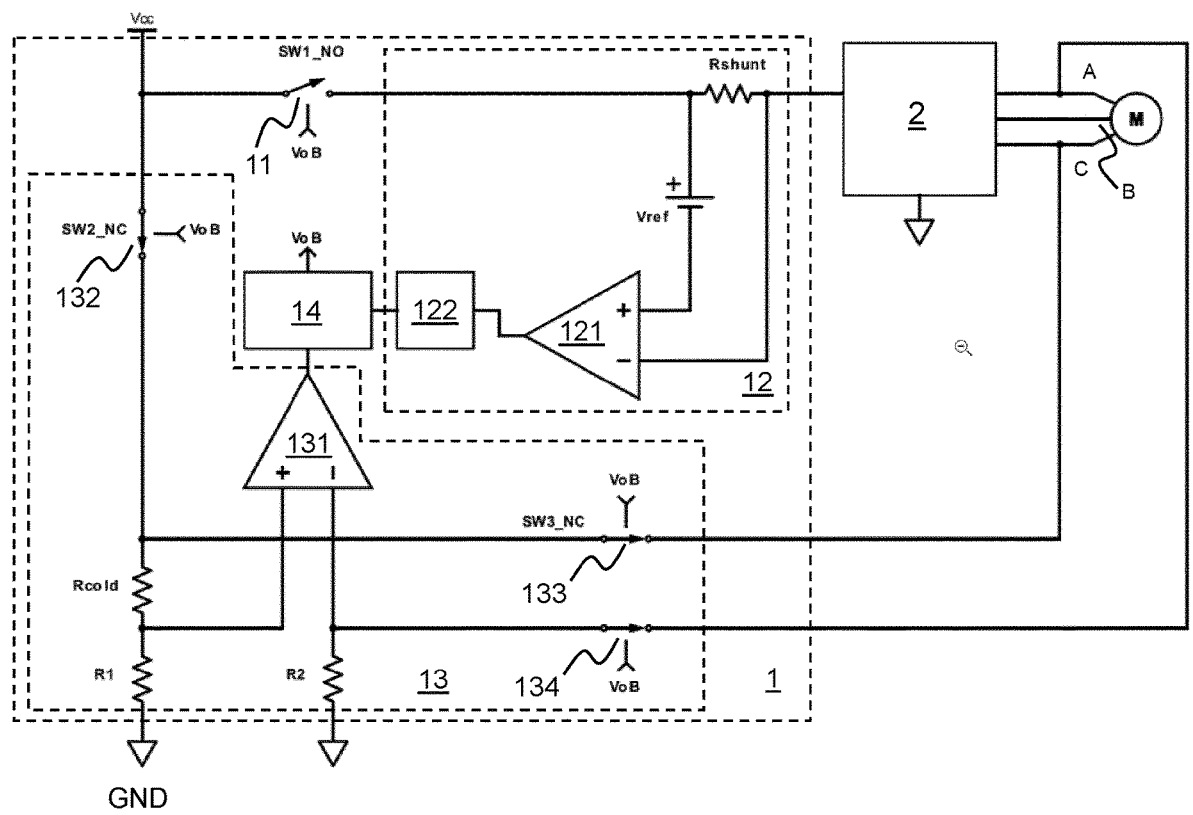
FIG. 2 shows the embodiment of FIG. 1 in the overload mode.

In the following, reference is first made to FIG. 1 and FIG. 2. FIG. 1 and FIG. 2 show a first embodiment of a motor protection device 1 in an operational configuration together with a power supply, a power module 2 and an electric motor M as schematic circuit diagram. FIG. 1 shows the operation mode and FIG. 2 shows the overload mode. The electric motor M, the power module 2 and the overload detection circuit 12 form, in combination, an electric drive that is powered via the power supply.

The power supply is exemplarily assumed as constant voltage DC power supply with supply voltage Vcc. It is noted that throughout this document a voltage is generally assumed as measured against ground (GND) potential.

The motor M is exemplarily assumed as electronically commutated motor. The drive circuit 2 is designed as generally known in the art. It generates at its output side the drive signals for the three motor phases respectively the three motor coils (not individually shown) of electric motor M from the supply voltage Vcc which is supplied to the input side of the power module 2. The input side of the drive circuit 2 is in this example given by a supply voltage terminal and a ground (GND) terminal. The motor coils may be configured as star respectively Y circuit, or as delta (Δ) circuit.

The motor protection device 1 comprises an interrupter unit 11, an overload detection unit 12, a recovery detection unit 13 and a bi-stable circuit 14. The interrupter unit 11 is schematically represented by a voltage-controlled switch with a control voltage VoB. The control voltage VoB is provided by the bi-stable circuit 14 as explained further below. The input side of the power module 2 is coupled with the power supply respectively supply voltage Vcc via the shunt resistor Rshunt if the voltage-controlled switch 11 is closed and disconnected from the power supply respectively supply voltage Vcc if the voltage-controlled switch 11 is open.

The overload detection unit includes a comparator 121, a timer circuit 122 and an overload voltage reference of overload reference voltage Vref. For exemplary purposes, the comparator 121 is shown as being realized by an operational amplifier (OpAmp) without feedback, as generally known in the art. Throughout this document, OpAmps are generally assumed as ideal. The comparator 121, the shunt resistor Rshunt and the overload voltage reference Vref form, in combination, a current monitoring circuit.

In the operation mode, a positive input of the comparator 121 is held on a constant voltage that is below the supply voltage Vcc by the overload reference voltage Vref. While the overload voltage reference is exemplarily shown as battery, it is in practice typically realized by a Zener-diode or other kind of voltage reference circuit as known in the art. The negative input of the comparator 121 is connected with the supply voltage terminal of the power module 2.

In the operation mode as illustrated in FIG. 1, the voltage drop over the shunt resistor Rshunt that results from the current drawn by the power module 2 and the motor M is smaller than the overload reference voltage Vref. Consequently, the voltage at the negative input of the comparator 121 is higher than at the positive input, and the output of the comparator 121 will be LOW. (The expressions LOW and HIGH are used in the ordinary sense of digital respectively binary circuitry. LOW corresponds typically to ground (GND) potential, while HIGH corresponds to a different potential).

An overload condition occurs if the current that is drawn by the power module 2 and the motor M reaches a value where the voltage drop over the shunt resistor Rshunt exceeds the overload reference voltage Vref. At this point, the voltage at the negative input of the comparator 121 will fall below the voltage at the positive input and the output of the comparator respectively OpAmp 121 will change from LOW to HIGH. This change at the output of comparator 121 triggers a start of the optional timer circuit 122 that is connected with the output of comparator 121. An output of the timer circuit changes its state (e. g. from LOW to HIGH or vice versa) if the output of comparator 121 continuously stays HIGH for a given overload time threshold. The overload time threshold may, for example, be in a range of few seconds to several minutes. If the output of the comparator 121 falls again to LOW potential during this time interval, the output of the timer circuit 122 does not change. The output of the timer circuit 122 is connected with a first input, in particular a set input, of bi-stable circuit 14 and is a first control signal. The bi-stable circuit may, for example, be realized by a set/reset (R/S) flip-flop. As the output of timer circuit 122 and accordingly the set input of the bi-stable circuit 122 changes its state as explained before, an output of the bi-stable circuit 14 switches the control voltage Vob, thereby controlling the interrupter unit respectively voltage-controlled switch 11 to disconnect the power module 2 from the supply voltage Vcc, such that the electric motor M is not further energized. The motor protection device 1 accordingly switches from the operation mode into the overload mode. In dependence of the implementation, switching from the operation mode into the overload mode is determined by a switching of the control voltage Vob HIGH to LOW or vice versa.

The operation of motor protection device 1 in the overload mode and the operation of recovery detection unit 13 is described in the following with particular reference to FIG. 2.

The recovery detection unit 13 includes in this design a comparator respectively OpAmp 131, similar to comparator 121, a voltage divider with resistors Rcold, R1, a resistor R2 and voltage-controlled switches 132, 133, 134. The voltage-controlled switches 132, 133, 134 are also controlled by the control voltage Vob, but operate complementary to the interrupter unit respectively voltage-controlled switch 11 as explained before. That is, if the voltage-controlled switch 11 is closed, the voltage controlled switches 132, 133 134 of the recovery detection unit 13 are open, and vice versa. Consequently, the voltage-controlled switches 132, 133, 134 are open in FIG. 1 (operation mode) and are closed in FIG. 2 (overload mode).

In the overload mode, a recovery reference voltage is provided to the positive input of comparator 131. The recovery reference voltage is tapped at the center tap between the resistors Rcold and R1, which are arranged in series between the supply voltage VCC and GND. The resistor Rcold is connected with the supply voltage Vcc via the voltage-controlled switch 132, such that the voltage divider that is formed by Rcold and R1 is powered and operative only in the overload mode. It is noted that the recovery reference voltage at the positive input of comparator 131 may alternatively be implemented differently.

Further in the overload mode, one of the motor contacts of Motor M (exemplarily motor contact A) is connected with the supply voltage Vcc via the voltage-controlled switches 132 and 133. Another motor contact (exemplarily motor contact C) is in the overload mode connected via voltage-controlled switch 134 with ground via the resistor R2 and further with the negative input of comparator 131. The total resistance between motor contacts A and C corresponds to the resistance of one or more of the motor coils, in dependence of the configuration of motor M (delta (Δ) configuration respectively Y-configuration). The comparator 131, the voltage divider with resistors Rcold, R1 and the resistor R2 form, in combination, an electrical resistance monitoring circuit. The connection of voltage controlled switches 133, 134 to motor contacts A, C form a resistance sensing input for the resistance monitoring circuit 13.

While another dimensioning may be used as well, the resistors R1 and R2 are dimensioned equally in this example. As long as the resistance between the motor contacts A, C is higher than the resistance of Rcold (corresponding to the motor temperature being above the motor temperature threshold), the voltage at the negative input of comparator 131 is lower than the voltage at its positive input and the output of comparator 131 will accordingly be HIGH. As a sinking motor temperature results in the resistance between motor contacts A and C decreasing below the resistance of Rcold (corresponding to the motor temperature being below the motor temperature threshold), the voltage at the negative input of comparator 131 will be higher the voltage at the positive input. The voltage at the output of comparator 131 accordingly changes from HIGH to LOW. The output of the comparator 131 provides a second control signal and is connected with a second input, in particular a reset input, of bi-stable circuit 14. Consequently, the bi-stable circuit 14 will again switch the control voltage VoB, such that voltage-controlled switches 132, 133, 134 are opened and the interrupter unit respectively voltage-controlled switch 11 is closed. The motor protection device 1 accordingly returns from the configuration of FIG. 2 (overload mode) to the configuration of FIG. 1 (operation mode).

It is noted that the resistors Rcold, R1, R2 are dimensioned such that the current that flows through the motor M is favorably a small monitoring current in order to avoid further heating of the motor M. Since the current is a simple DC current without commutation, the motor M will in any case not start.

Figure 3:
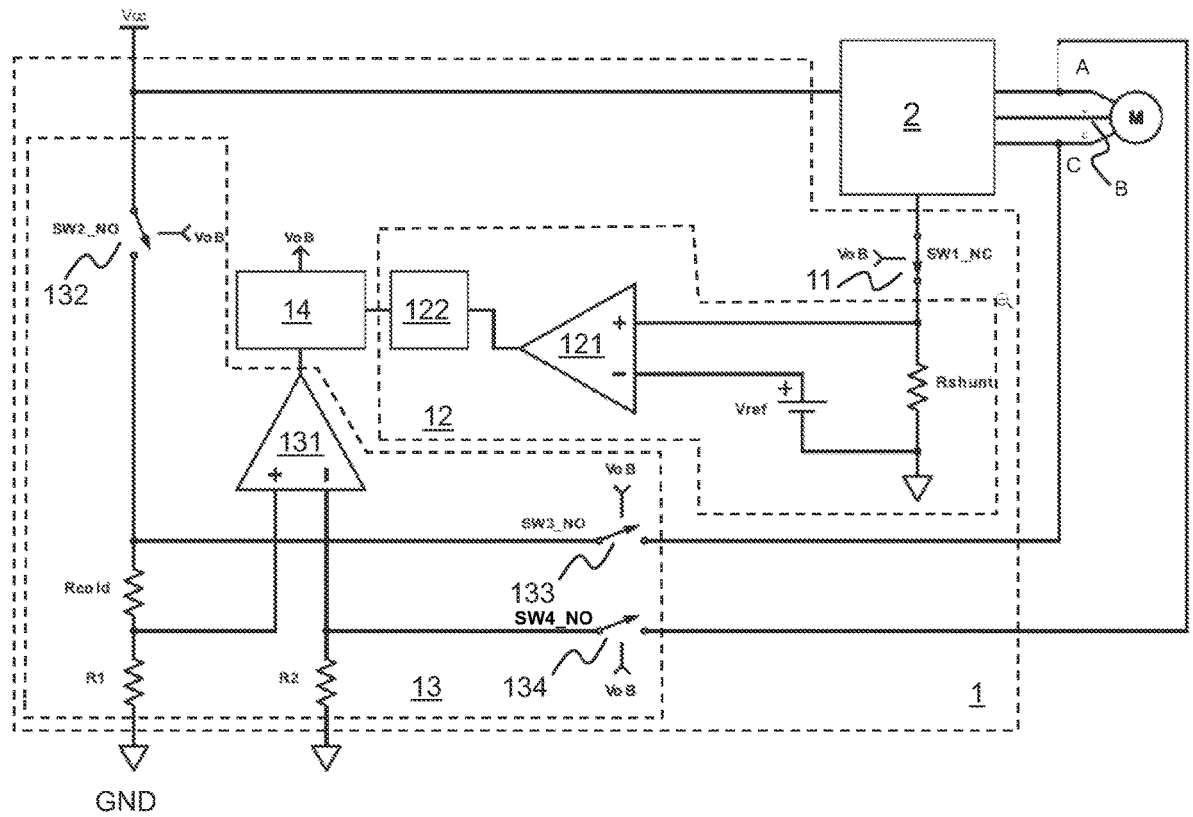
FIG. 3 shows a further embodiment of a motor protection device in the operation state.
Figure 4:
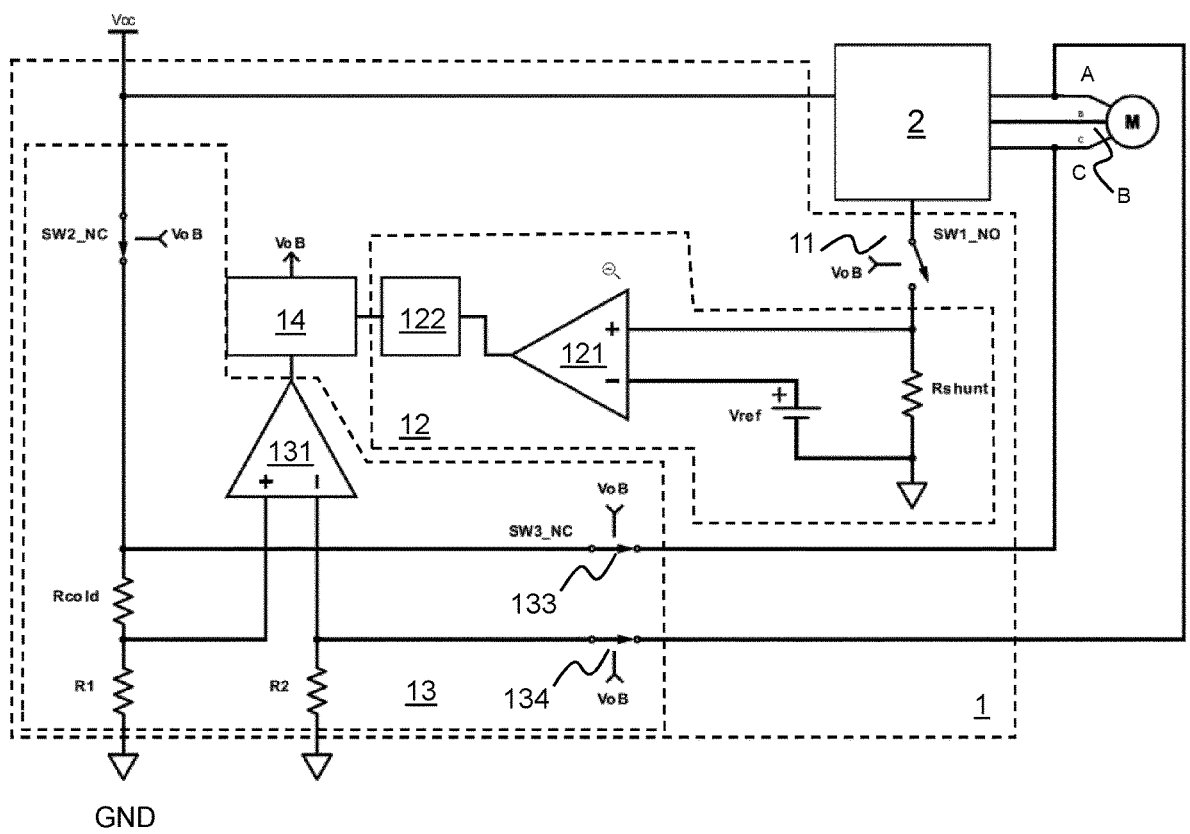
FIG. 4 shows the embodiment of FIG. 3 in the overload mode.

In the following, reference is additionally made to FIG. 3 and FIG. 4, showing an embodiment of a power module similar to the embodiment of FIG. 1 and FIG. 2 as explained before, with FIG. 3 showing the operation mode (similar to FIG. 1) and FIG. 4 showing the overload mode (similar to FIG. 2). The following description is focused on the differences.

In the embodiment of FIG. 3 and FIG. 4, the interrupter unit respectively voltages controlled switch 11 and the shunt resistor Rshunt are arranged at the input side of power module (2) in the connection from power module 2 to GND. Further, the overload voltage reference Vref is arranged to hold the negative input of comparator 121 on a constant voltage that is above GND by the overload reference voltage Vref. The positive input of comparator 121 is connected with the input side of the power module 2 via the interrupter unit respectively voltage-controlled switch 11. As long as the voltage drop over the shunt resistor Rshunt is smaller than the overload reference voltage Vref, the voltage at the positive input of comparator 121 will be below the voltage at the negative input and the output of comparator 121 will accordingly be LOW. As the voltage drop over the shunt resistor Rshunt exceeds the overload reference voltage Vref, the voltage at the positive input of the comparator 121 is higher than the voltage at the negative input, and the output of the comparator 121 will accordingly change from LOW to HIGH.

Figure 5:
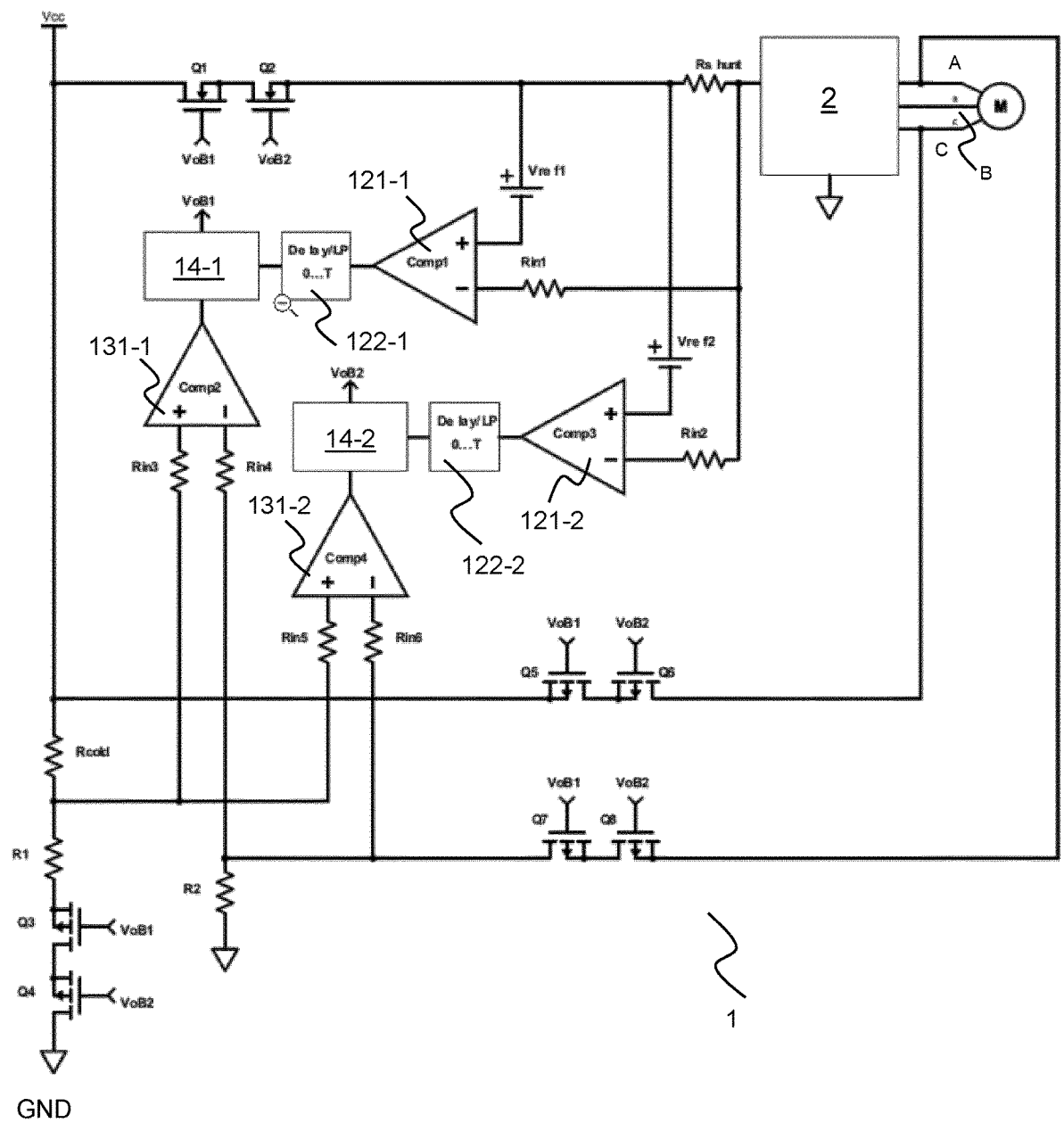
FIG. 5 shows a still further embodiment of a motor protection device.

In the following, reference is additionally made to FIG. 5, showing a further embodiment of a motor protection device. This embodiment is similar to the embodiment of FIGS. 1, 2 and the following description is focused on the differences. Further, the individual units of the motor protection device 1 are not referenced as such for the sake of clarity.

In the embodiment of FIG. 5, all voltage-controlled switches are specifically shown as MOSFETs. A major difference to the embodiment of FIG. 1 and FIG. 2 is that the interrupter unit and the bi-stable circuit are designed in a redundant manner. Further, the overload detection unit and the recovery detection unit are designed in a partly redundant manner.

The interrupter unit comprises two MOSFETs Q1, Q2 in serial arrangement. MOSFET Q1 is controlled by a first control voltage VoB1 and MOSFET Q2 is separately controlled by a second control voltage VoB2. An electrical connection of the input side respectively the supply voltage terminal of the power module 2 with the supply voltage Vcc requires both MOSFETs Q1, Q2 to be switched-on respectively connected through. The first control voltage VoB1 is provided by a first bi-stable circuit 14-1 and the second control voltage VoB2 is provided by a separate second bi-stable circuit 14-2. Similarly, first and second overload reference voltages Vref1, Vref2, first and second comparators 121-1, 121-2, and first and second timer circuits 122-1, 122-2 are provided. The negative inputs of the comparators 121-1, 121-2 are connected with the supply voltage terminal of the power module 2. The coupling is in this example via coupling resistors Rin1, Rin2. The resistors Rin1, Rin2, Rin3, Rin4, Rin5, Rin6 connected to the inputs of the comparators 121-1, 121-2, 131-1, 131-2 are introduced in order to avoid that a fault in one comparator will influence the redundant comparator (e.g. comparators 121-1 and 121-2). This is beneficial in applications where the motor protection 1 unit is required to achieve a first-fault robustness.

In the shown design, the first comparator 121-1 and the second comparator 121-2 separately compare the voltage drop over the shunt resistor Rshunt with the (substantially identical) overload reference voltages Vref1 and Vref2, respectively. The outputs of the comparators 121-1, 121-2 separately connected with a first input, in particular a set input, of associated bi-stable circuit 14-1 respectively 14-2 via a timer circuit 122-1 respectively 122-2 as explained before.

The recovery detection unit includes separate comparators 131-1, 131-2, the output of which are each connected with the second input, in particular a reset input, of the associated bi-stable circuit 14-1, 14-2. The voltage divider with resistors Rcold, R1 operates in substantially the same way as explained before. In contrast to the embodiment of FIGS. 1, 2, however, two voltage-controlled switches in form of MOSFETs Q3, Q4 are arranged between R1 and ground. The positive inputs of the comparators 131-1, 132 are each separately connected with the center tap between Rcold and R1 via (identical) separate coupling resistors Rin3, Rin5. For coupling the motor terminals, A, C with the supply voltage Vcc and the resistor R2, two pairs of voltage-controlled switches in form of MOSFETs are provided, with MOSFETs Q5, Q6 being arranged in series between motor contact C and, Vcc while MOSFETs Q7, Q8 are arranged in series between motor contact A and R2. In each pair Q5, Q6 respectively Q7, Q8, one of the MOSFETs is controlled by the first control voltage VoB1, while the other MOSFET is controlled by the second control voltage VoB2. The resistor R2 is connected with the negative input of both comparators 131-1, 131-2 via coupling resistors Rin4, Rin6. All coupling resistors Rin1 . . . Rin6 may be dimensioned identically. It can be seen that the MOSFETs Q3 and Q4, Q5 and Q6, Q7 and Q8 are arranged pairwise in series. In this way single fault robustness is achieved in that each MOSFET of a pair can interrupt the circuit even if the other MOSFET of the pair is shortcut.

In the described embodiments, no recovery time threshold is taken into account as explained in the general description. If a recovery time threshold shall be taken into account, one or more timer circuit(s), similar to timer circuits 122, 122-1, 122-2 may for example be introduced between the output of comparators 131, 131-1, 131-2, and the bistable circuits 14, 14-1, 14-2.

Figure 6:
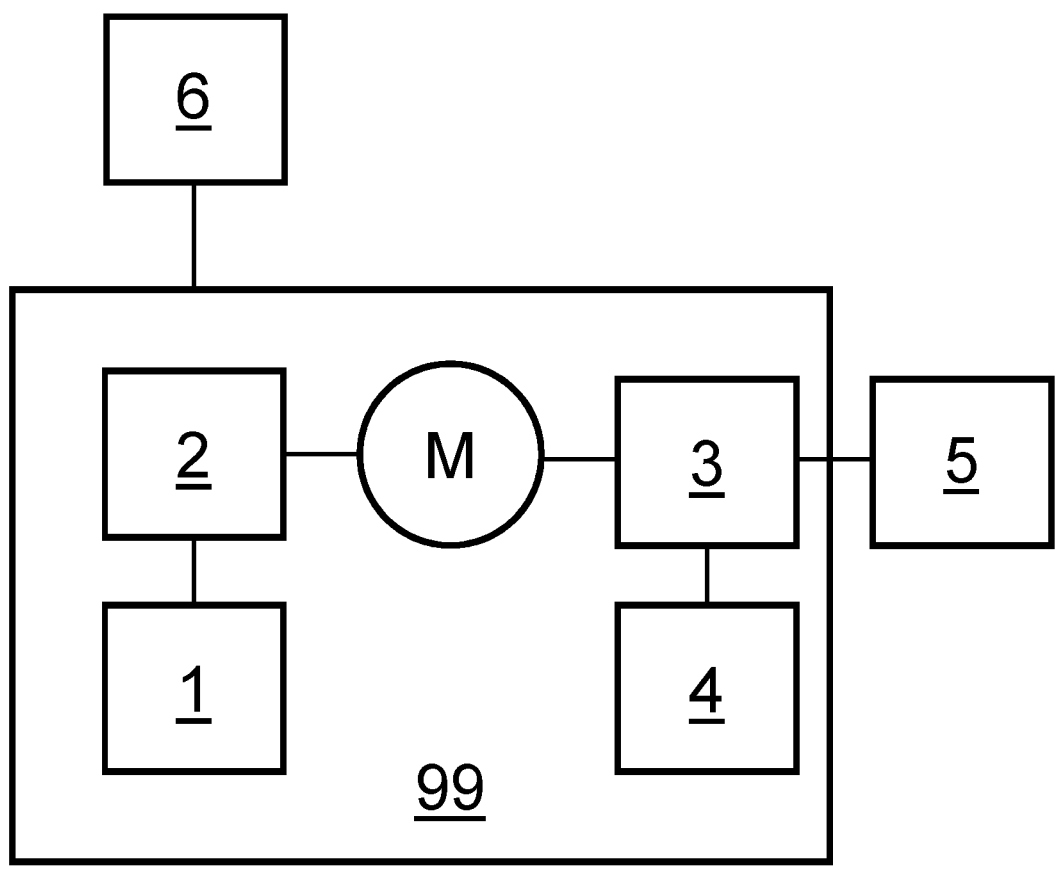
FIG. 6 shows an electric drive in operative coupling with a driven device.

In the following, reference is additionally made to FIG. 6. FIG. 6 schematically shows an electric drive 99 in operative coupling with a driven device 5. The driven device 5 may for example be a valve or a damper. The electric drive 99 includes a motor protection device 1, a power module 2 and an electric motor M as described before. The electric motor M is coupled with the driven device 5 via an optional reduction gear 3. In the shown embodiment, the electric drive is exemplarily realized as spring return drive with an optional return spring 4. The return spring 4 is operatively coupled to the force/torque flow between the motor M and the driven device 3.

Optionally, an external control device 6, such as a HVAC control and/or fire protection system is operatively coupled with the electric drive 99 for controlling the electric drive 99 during regular operation as generally known in the art.

REFERENCE SIGNS 1 motor protection device
2 power module
3 reduction gear
4 return spring
5 driven device
6 external control device
11 interrupter unit/voltage-controlled switch, MOSFET
12 overload detection unit
121, 121-1, 122-2 comparator/OpAmp
122, 122-1, 122-2 timer circuit
13 recovery detection unit
131, 131-1, 131-2 comparator/OpAmp
132, 133, 134 voltage controlled switch, MOSFET
14, 14-1, 14-2 bi-stable circuit
99 electric drive
M electric motor
Rcold, R1, R2, Rin1, Rin2, Rin3, Rin4, Rin5, Rin6 resistor
Rshunt shunt resistor
Q1, Q2, Q3, Q4, Q5, Q6, Q7, Q8 MOSFET
Vref, Vref1, Vref2 overload reference voltage
VoB control voltage
VoB1 first control voltage (in case of redundancy)
VoB2 second control voltage (in case of redundancy)
A, B, C motor contact
Vcc supply voltage
GND ground

The invention claimed is:

1. A motor protection device (1), the motor protection device (1) including:
   a) an interrupter unit (11, Q1, Q2) for electrically connecting a power supply (Vcc) and an electric motor (M) in an operation mode and electrically dis-connecting the power supply (Vcc) and the electric motor in an alternative overload mode;
   b) an overload detection unit (12), wherein the overload detection unit (12) is configured to monitor a motor current and to control the interrupter unit (11, Q1, Q2) to switch from the operation mode into the overload mode if the motor current indicates an overload condition of the electric motor (M) in the operation mode;

c) a recovery detection unit (13), the recovery detection unit (13) being configured to monitor a motor temperature and to control the interrupter unit (11, Q1, Q2) to switch from the overload mode back into the operation mode if the motor temperature indicates a recovery from the overload condition.

2. The motor protection device (1) according to claim 1, wherein the motor temperature is a temperature of one or more motor coils of the electric motor (M).

3. The motor protection device (1) according to claim 2, wherein the recovery detection unit (13) is configured to monitor a resistance of the one or more motor coil(s).

4. The motor protection device (1) according to claim 1, wherein the motor protection device (1) is configured to electrically connect a sensing input of the recovery detection unit with the electric motor (M) in the overload mode and to disconnect the sensing input and the electric motor (M) in the operation mode.

5. The motor protection device (1) according to claim 1, wherein the motor protection device (1) includes a shunt resistor (Rshunt) and wherein the overload detection unit (12) is configured to monitor the motor current by measuring a voltage drop over the shunt resistor (Rshunt).

6. The motor protection device (1) according to claim 1, wherein monitoring the motor current includes comparing the motor current with a given motor current threshold.

7. The motor protection device (1) according to claim 6, wherein the motor current indicates an overload condition if the motor current exceeds the motor current threshold for a given overload time threshold.

8. The motor protection device (1) according to claim 1, wherein monitoring the motor temperature includes comparing the motor temperature with a given motor temperature threshold.

9. The motor protection device (1) according to claim 8, wherein the motor temperature indicates a recovery from the overload condition if the motor temperature remains below the motor temperature threshold for a given recovery time threshold.

10. The motor protection device (1) according to claim 1, wherein at least one of the interrupter unit (11, Q1, Q2), the overload detection unit (12) and the recovery detection unit (13) is designed in an at least partly redundant manner.

11. An electric drive (99), wherein the electric drive (99) includes a motor protection device (1) according to claim 1 and an electric motor (M).

12. The electric drive (99) according to claim 11, wherein the electric motor (M) is an electronically commutated motor.

13. The electric drive according to claim 11, wherein the electric drive includes a power module (2), wherein the power module (2) is electrically connected with the electric motor (M), and wherein the interrupter unit (11, Q1, Q2) is electrically connected or integral with the power module (2).

14. A method for operating an electric motor (M) comprising using a motor protection device according to claim 1.

15. A method for operating an electric motor (M), the method including the steps of:
 a) connecting the electric motor (M) a power supply (Vcc) in an operation mode;
 b) monitoring, in the operation mode, a motor current and switching from the operation mode into an alternative overload mode if the motor current indicates an overload condition of the electric motor (M), wherein the electric motor (M) and the power supply are disconnected in the overload mode;
 c) monitoring, in the overload mode, a motor temperature of the electric motor (M) and switching from the overload mode back into the operation mode if the motor temperature indicates a recovery from the overload condition.

* * * * *